(12) United States Patent
Sharma et al.

(10) Patent No.: US 7,356,573 B2
(45) Date of Patent: Apr. 8, 2008

(54) APPARATUS AND METHODS FOR DATA TAPPING IN A STORAGE AREA NETWORK

(75) Inventors: Samar Sharma, Sunnyvale, CA (US);
Roy M. D'Cruz, Sunnyvale, CA (US);
Sanjaya Kumar, Fremont, CA (US);
Prashant Billore, San Jose, CA (US);
Dinesh G. Dutt, Sunnyvale, CA (US);
Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 11/177,880

(22) Filed: Jul. 8, 2005

(65) Prior Publication Data
US 2007/0011276 A1     Jan. 11, 2007

(51) Int. Cl.
*G06F 15/16* (2006.01)
*G06F 15/167* (2006.01)
*G06F 3/00* (2006.01)
*H04L 12/50* (2006.01)

(52) U.S. Cl. .................. 709/218; 709/212; 709/220; 370/381; 710/5

(58) Field of Classification Search ............... None
See application file for complete search history.

(56) References Cited

U.S. PATENT DOCUMENTS

| | | |
|---|---|---|
| 6,182,197 B1 | 1/2001 | Dias et al. |
| 6,681,310 B1 | 1/2004 | Kusters et al. |
| 6,735,636 B1 * | 5/2004 | Mokryn et al. ............. 710/5 |

(Continued)

OTHER PUBLICATIONS

EMC2 and Fujitsu Siemens Computers, Global Recovery Demonstration: SRDF/A and PRIMECLUSTER—EMC Remote Data Facility/Asynchronous Fujitsu Siemens Computers PRIMECLUSTER, Feb. 2004, pp. 1-26.
EMC2, EMC SRDF Family, Powerful remote replication solutions improve organizational productivity, enhance online business continuity, Sep. 2004.

(Continued)

*Primary Examiner*—Wen-Tai Lin
(74) *Attorney, Agent, or Firm*—Beyer Weaver LLP (57) ABSTRACT

Disclosed are methods and apparatus for data tapping within a storage area network (SAN) and providing tapped data to a third party device, such as an appliance. In general, mechanisms are provided in a SAN to allow a data tap of data flowing between an initiator and a target. In one implementation, a data virtual target (DVT) in created in a network device to intercept data sent by a specific initiator to a specific logical unit of a specific target. The data or a copy of the data is sent to both the specific logical unit of the specific target and to an appliance. The data routing may be accomplished by use of a virtual initiator (VI), which is configured to send the data (or a copy of the data) to the specific target and the appliance. In a transparent mode of operations, the DVT has a same PWWN (port world wide name) and FCID (fibre channel identifier) as the specific target. In a first proxy mode of operation, the DVT has a different PWWN and FCID than the specific target. In a second proxy mode of operation, the DVT has a same PWWN and different FCID than the specific target.

23 Claims, 7 Drawing Sheets

U.S. PATENT DOCUMENTS

| | | |
|---|---|---|
| 7,003,780 B2 | 2/2006 | Peloquin et al. |
| 7,072,894 B2 | 7/2006 | Loy et al. |
| 2001/0037371 A1* | 11/2001 | Ohran .................. 709/214 |
| 2002/0191649 A1* | 12/2002 | Woodring ............. 370/906 |
| 2004/0143639 A1* | 7/2004 | Rangan et al. ........ 709/212 |
| 2005/0157730 A1* | 7/2005 | Grant et al. ........... 370/401 |
| 2006/0013222 A1* | 1/2006 | Rangan et al. ........ 370/389 |
| 2006/0080416 A1* | 4/2006 | Gandhi .................. 709/220 |

OTHER PUBLICATIONS

International Search Report dated Sep. 13, 2007, received in related PCT Application No. PCT/US06/26640 (2 pages).

Written Opinion dated Sep. 13, 2007, received in related PCT Application No. PCT/US06/26640 (6 pages).

* cited by examiner

APPARATUS AND METHODS FOR DATA TAPPING IN A STORAGE AREA NETWORK

BACKGROUND OF THE INVENTION

The present invention relates to storage area networks. More particularly, the present invention relates to methods and apparatus for facilitating intelligent services with respect to data flowing between an initiator and a target, or the like.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

It would be beneficial to provide services with respect to a SAN. It would especially be useful to provide a mechanism for tapping the data flow within the SAN so as to facilitate applications that could use such tapped data, such as continuous backup, traffic analysis, or remote replication applications.

SUMMARY OF THE INVENTION

The present invention provides methods and apparatus for data tapping within a storage area network (SAN) and providing tapped data to a third party device, such as an appliance. In general, mechanisms are provided in a SAN to allow a data tap of data flowing between an initiator and a target. In one implementation, a data virtual target (DVT) is created in a network device to intercept data sent by a specific initiator to a specific logical unit of a specific target. The data or a copy of the data is sent to both the specific logical unit of the specific target and to an appliance. The data routing may be accomplished by use of a virtual initiator (VI), which is configured to send the data (or a copy of the data) to the specific target and the appliance. In a transparent mode of operations, the DVT has a same PWWN (port world wide name) and FCID (fibre channel identifier) as the specific target. In a first proxy mode of operation, the DVT has a different PWWN and FCID than the specific target. In a second proxy mode of operation, the DVT has a same PWWN and different FCID than the specific target.

In one embodiment, a method of facilitating data tapping in a storage area network is disclosed. In a storage area network (SAN), SAN data that is being sent from an initiator to a target is received and the SAN data or a copy of the SAN data is sent to both the target and to an appliance device. The target can be a real target or a virtual target. In one aspect, the appliance device is configured with at least one application that uses the SAN data or a copy of the SAN data.

In a specific implementation, a data virtual target (DVT) is created within a network device of the SAN such that the DVT receives the SAN data from the initiator. The network device is arranged to receive data from the initiator and send data to the target. A virtual initiator (VI) is created in the network device such that the VI sends the SAN data received by the DVT or a copy of the SAN data to both the target and to the appliance device. In a further aspect, the creation of the DVT and the VI is specified by the appliance device by sending one or more commands to the network device. In yet a further aspect, one or more commands are received from the appliance device in the network device. The one or more commands specify creation of the DVT. In yet a further feature, a control virtual target (CVT) is created in the network device for receiving the one or more commands from the appliance device regarding data tapping setup or initiation or control. In an alternative feature, the one or more commands specify the initiator, the target, and a specific logical unit (LUN) of the specified target to thereby define a specific session for data tapping on the specified DVT.

In another specific implementation, a copy of the SAN data is sent to the appliance device and the SAN data is sent to the target. An FCID (fibre channel identifier) and LUN (logical unit) of the appliance device is substituted for the FCID and LUN of the target in the SAN data copy prior to sending the SAN data copy to the appliance device. In a specific procedure for setting up a network device, the initiator and the appliance device are coupled to ports of a network device with the target being also initially coupled or previously coupled with the network device. Security are also configured for the network device and specific VSANs and zones are configured as needed on specific ports and/or slots of the network device. Specific one or more ports of the network device are enabled for data tapping. A data virtual target (DVT) is created on an enabled port of the network device such that the DVT receives the SAN data from the initiator. The network device is configured to receive data from the initiator and send data to the target. One or more sessions are specified for implementing a data tap on the created DVT. The data tap is then commenced on the created DVT and its associated session(s) so that SAN data from the initiator or a copy of the SAN data from the initiator is sent to both the target and appliance device.

In a specific embodiment, the DVT has a same port world wide name (PWWN) and fibre channel identifier (FCID) as the target. In another embodiment, the DVT has a same PWWN as the target's PWWN, but a different FCID than the target's FCID. In yet another embodiment example, the DVT has a different PWWN than the target's PWWN and a different FCID than the target's FCID.

In another embodiment, the invention pertains to an apparatus operable to facilitate data tapping in a storage area network. The apparatus includes one or more processors and one or more memory. At least one of the memory and processors are adapted to provide at least some of the above described method operations.

In an alternative embodiment, the invention pertains to a system for facilitating data tapping in a storage area network. The system includes a target in a storage area network (SAN) for receiving requests from initiators and an initiator for sending SAN data to the target. The system further includes a network device in the SAN coupled to the initiator and target and configured for handling SAN data traffic between the initiator and the target. The network device includes a device virtual target (DVT) for receiving SAN data from the initiator and a virtual initiator for sending the SAN data or a copy of the SAN data to both the target and an appliance outside the SAN.

In a specific aspect, the system includes a remote storage device coupled with the appliance, and the appliance is configured to send the SAN data or the copy of the SAN data to the remote storage device for the purpose of remote replication. In another aspect, the system includes a remote storage device coupled with the appliance, the appliance is configured to send the SAN data or the copy of the SAN data to the remote storage device at various increments of time for the purpose of continuous backup so that one can access the SAN data that was sent during specific periods of time. In one implementation, the appliance is configured to create the DVT in the network device and to associate one or more unique session(s) for such created DVT so that data tapping is performed on the DVT for the associated unique one or more session(s).

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
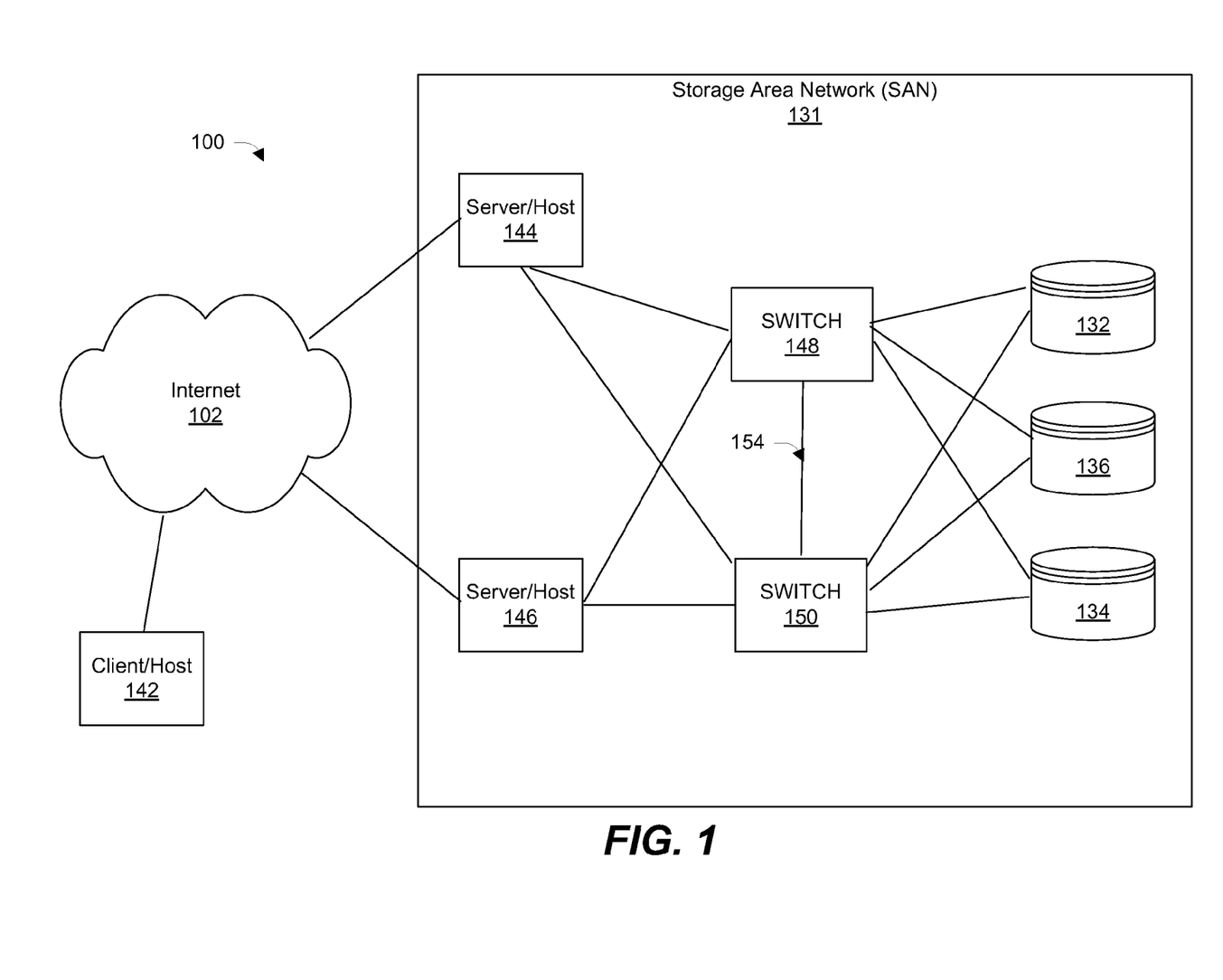
FIG. 1 is a block diagram illustrating an exemplary storage area network in which various embodiments of the invention may be implemented.

FIG. 1 is a block diagram illustrating an exemplary network 100 in which various embodiments of the invention may be implemented. As shown, network 100 includes a storage area network (SAN) 131, such as a bank's financial data center, for handling requests for data as initiated by any suitable type of entity, such as a customer's host or client computer 142. Of course, a plurality of hosts/clients (not shown) typically would be able to access such a SAN 131. In current networks, the client 142 typically sends requests to SAN 131 via a wide area network, such as the Internet 102. The SAN 131 may also implement virtualization as described further below, and such a network may be referred to as a virtual storage area network (VSAN). Virtualization generally refers to the use of software entities to represent one or more physical entities. For example, a virtual port may represent two physical ports. However, so as to simplify this initial description, only a SAN without virtualization will be described although embodiments of the present invention include at least some virtualized entities in the SAN.

In a SAN, data may be read from, as well as written to, various portions of a plurality of storage devices (e.g., 132, 134, and 136) within SAN 131 in response to commands sent by client 142 to one or more servers or hosts, e.g., 144 and 146, of SAN 131. In general, the data may be accessed by any number of hosts or clients although not illustrated in FIG. 1. Communication among the storage devices and hosts is accomplished by coupling the storage devices and hosts together via one or more switches, routers, or other network nodes configured to perform switching functions. In this example, switches 148 and 150 may also communicate with one another via an interswitch link 154.

Although the network devices described above with reference to FIG. 1 are described as switches, these network devices are merely illustrative. Thus, other network devices such as routers may be implemented to receive, process, modify and/or generate packets or frames with functionality such as that described herein for transmission in a storage area network. Moreover, the above-described network devices are merely illustrative, and therefore other types of network devices may be implemented to perform the disclosed inventive embodiments.

In some of the discussion herein, the functions of switches of this invention are described in terms of the SCSI protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel—Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Eternet, FV, etc. For example, the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to read from or write to a "virtual" target having a virtual address, a fabric switch (or some other mechanism) first converts those instructions to a physical target address before instructing the target.

Figure 2:
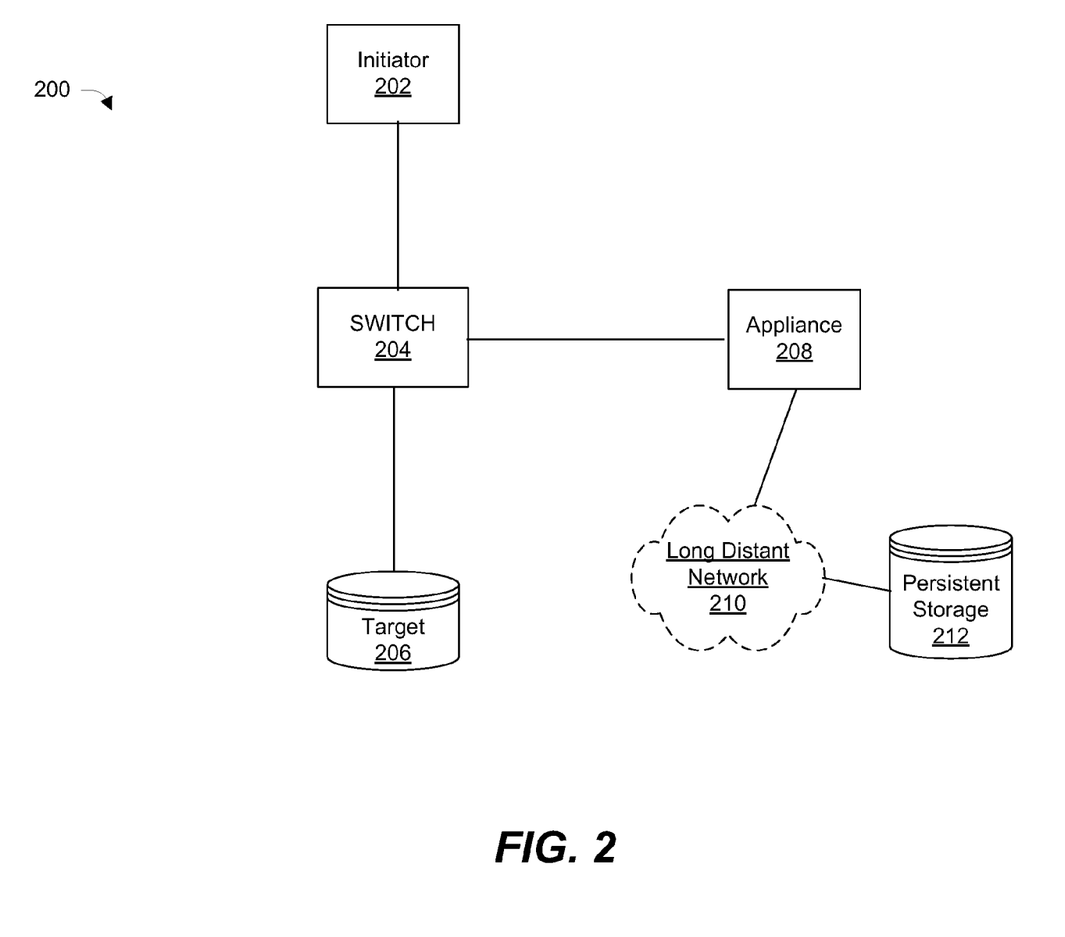
FIG. 2 is a diagrammatic representation of a network segment that includes an appliance for tapping storage area network (SAN) or virtual storage area network (VSAN) data flow between an initiator and a target in accordance with one embodiment of the present invention.

FIG. 2 is a diagrammatic representation of a network segment 200 that includes an appliance 208 for tapping SAN or VSAN data flow between an initiator 202 and a target 206 in accordance with one embodiment of the present invention. As shown, the initiator 206 accesses data on target 206 via switch 204. Typically, a pair of redundant switches (not shown) would be used in the event of failure of a one of the switch pairs. Typically, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Thus, each initiator will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports.

In embodiments of the present invention, an appliance device receives data that is being sent between the initiator and target. As shown, an appliance 208 is coupled to switch 204 and the switch 204 is configured or set up to allow the appliance access to data flowing between initiator 202 and target 206. Appliances generally may be configured to store SAN or VSAN data in persistent memory (e.g., 212) for various applications without disrupting the flow in the SAN or VSAN. In one application, data written from the initiator to the target is replicated on a remote site by the appliance. For example, appliance 208 replicates data being sent from initiator 202 to target 206 and this replicated data is sent to a remote persistent storage 212 via a long distance network 210. In another application, data I/O between an initiator and target is tracked for each increment of time so that logs of I/O for discrete periods of time are kept. One can then retrieve data I/O between the initiator and target for a particular time period, for example, data that was lost for such period of time. One may also analyze the data over specific periods of time for various purposes.

In general, embodiments of the present invention allow one to tap into the SAN or VSAN data flow for these various appliance applications. In other words, embodiments of the present invention serve as enablers of appliance applications that require copies of SAN or VSAN data. Any suitable mechanism may be used to allow an appliance to tap the data I/O between an initiator and target.

In one implementation, a software entity for handling the data tap is configured or set up in the switch. This software entity is herein referred to as a data virtual target (DVT) and virtual initiator (VI). In one implementation, the appliance causes one or more DVT and VI pairs to be set up in a switch as needed. Several mechanisms for forming and handling virtual targets and virtual initiators are described further in "Cisco MDS 9000 Family Configuration Guide, Cisco MDS SAN-OS Release 1.1(1a)", Cisco Systems, Inc., January 2004. This document is incorporated herein by reference in its entirety.

Figure 3:
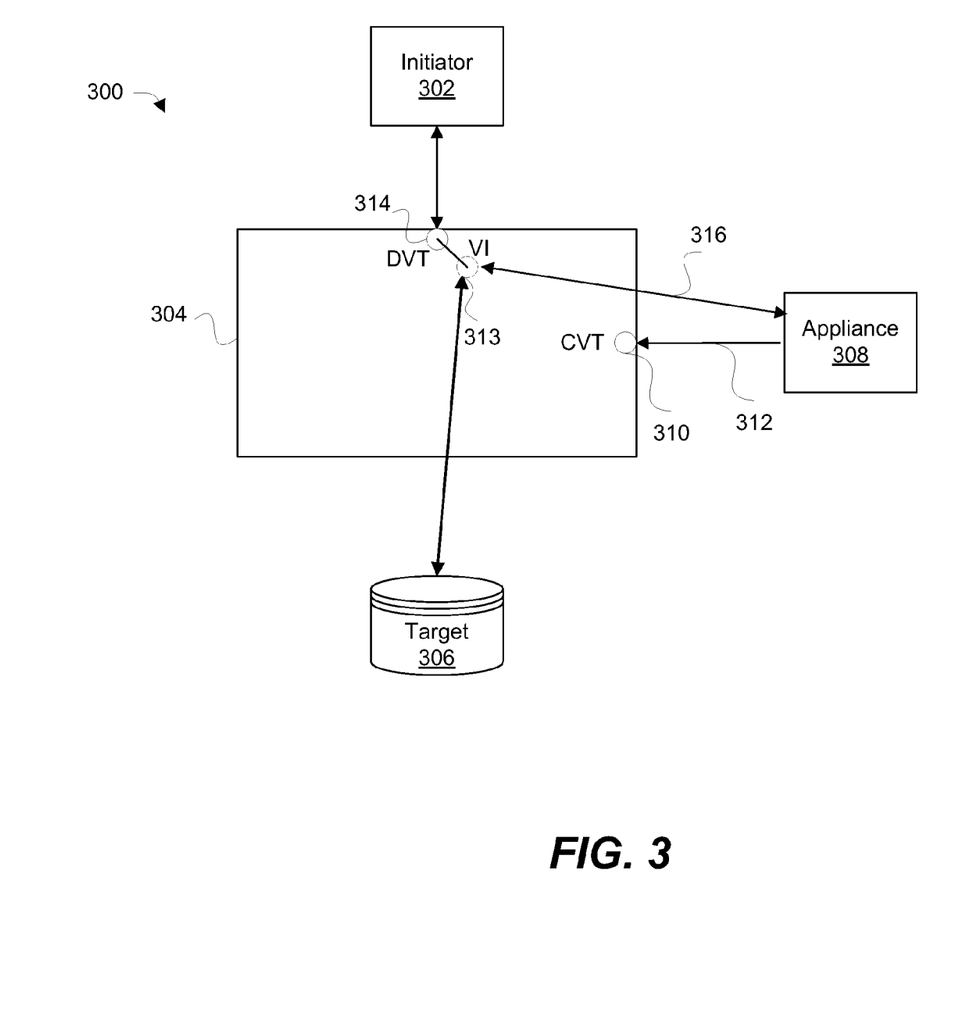
FIG. 3 is a diagrammatic representation of a network segment that illustrates a data virtual target (DVT) and virtual initiator (VI) mechanism for implementing data tapping in accordance with one embodiment of the present invention.

FIG. 3 is a diagrammatic representation of a network segment that illustrates a DVT 314 and VI 313 for implementing data tapping in accordance with one embodiment of the present invention. As shown in this example implementation, DVT 314 and VI 313 are set up between an initiator 302 and a target 306. The target and/or initiator may be virtual or real, physical devices. The DVT is configured to intercept data I/O between the initiator 302 and target 306 and route this data I/O to an associated appliance 308, as well as to the real target, via the associated VI. Several DVT and VI arrangements are further described below. A DVT and VI form just one example of an entity for performing such operations and are not meant to limit the scope of the invention to such specific DVT and VI entity.

A DVT and VI may be configured using any suitable mechanism and/or configured by any suitable entity. Preferably, each appliance is operable to configure a DVT in an appropriate switch as needed for its particular application. In a specific implementation, an appliance causes the switch to set up a DVT by sending a "create" command to the switch. As shown, a control virtual target (CVT) 310 is first set up in the switch for receiving commands from the appliance 308. The appliance 308 specifies to the switch through such CVT various aspects of a data tap. The appliance may also specify various other commands for affecting the data tap via its CVT. By way of example, the appliance may issue commands via its CVT to set up a DVT in the switch for a particular initiator and target session, initiate data copying from such session, cease data copying for such session, quiesce, unquiesce, special behaviors, etc. In the illustrated embodiment, appliance 308 specifies through CVT 310 that DVT 314 is to be created so as to tap data flowing between initiator 302 and target 306. Appliance 308 may also stop the data tap through such DVT 314.

In one embodiment, a session is identified by a specific associated initiator, target, and LUN (or logical units of the target that are accessible by the specific initiator). This set of information uniquely identifies a particular session or flow. In general, each DVT and VI pair created in a switch is configured to direct data from a specific flow to a specific appliance data target (ADT), which may be set up as a virtual target on the appliance side for receiving data. In one implementation, the initiator or host sets up a session between itself and a specific target and LUN. In one implementation, a copy is made of data received by a particular DVT. In the data copy frame, the FCID and LUN of the real target is replaced with the FCID and LUN that is associated with the appliance.

Figure 4:
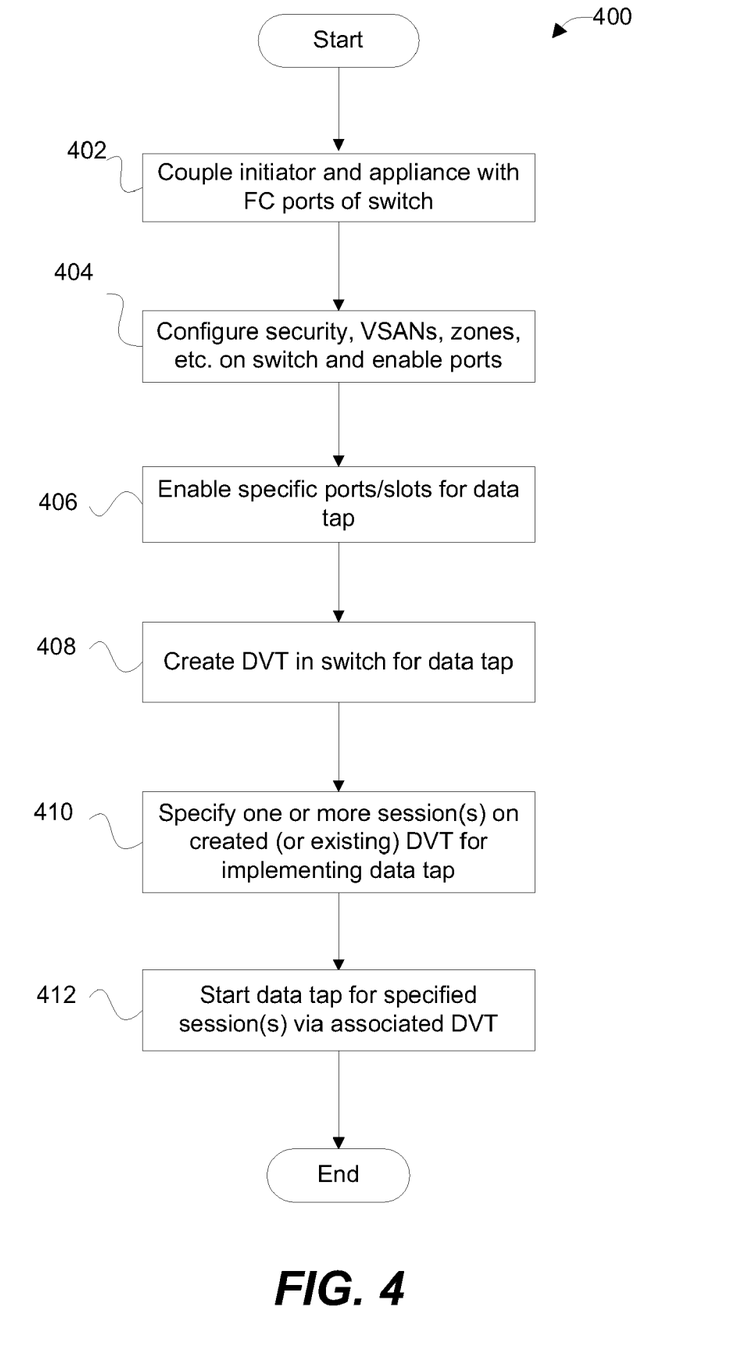
FIG. 4 is a flow chart illustrating a general process for enabling data tapping between a SAN or VSAN initiator and target in accordance with one embodiment of the present invention.

FIG. 4 is a flow chart illustrating a general process 400 for enabling data tapping between a SAN or VSAN initiator and target in accordance with one embodiment of the present invention. This process 400 provides set up of the data tap with minimum disruption. Initially, an initiator and appliance are coupled with ports (e.g., FC ports) on a network device (e.g., switch) in operation 402. This coupling may be direct or indirect. That is, the initiator or appliance may be coupled through one or more other network devices as explained further below with respect to different data tapping modes of operation. Of course, the initiator and appliance may also have access to other switches that serve the same target (e.g., a redundant switch). In this example, it is assumed that the targets or storage devices are already coupled with the switch.

The initiator and/or target may be coupled directly or indirectly with the switch through which the data tap is to be implemented, depending on the particular data tap configuration. For instance, the initiator and/or target may be coupled to the data tap switch via other switches and/or routers. Additionally, the appliance may access the data tap switch via any suitable network devices, such as other switches and/or routers.

Security, VSANs, zones, etc. may next be configured and the ports enabled on the data tap switch in operation 404. For example, the switch may be configured with an SNMP username and password to allow access to the switch by users. VSAN groups and zones may also be configured on the switch for each port/slot, for example. Specific ports/slots of the data tap switch may then be enabled for a data tap in operation 406. That is, particular ports and/or slots may be designated as allowing data tapping, while others are designated as not allowing data tapping. These switch configurations may be configured by any suitable entity, such as an administrator or software agent.

A DVT (and VI) may then be created on an enabled port/slot of the switch for implementing the data tap feature in operation 408. One or more session(s) may then be specified for the created DVT (and VI) for implementing the data tap in operation 410. Several techniques for creating a DVT and VI are further described below. In one implementation, an appliance specifies that a DVT is to be created for a particular target and then the switch automatically creates such DVT and corresponding VI. The data tap may then be initiated for one or more sessions (e.g., specified by the appliance) in operation 412, and the procedure for starting a data tap then ends.

A DVT (and VI) may take any suitable form for facilitating the data tap between an initiator and target. Three modes are described herein: proxy mode 1, proxy mode 2, and transparent mode. Each of these modes has its own associated advantages, as well as disadvantages. Each of these modes uses different identities for the DVT, where each identity is in the form of a World Wide Name (WWN) and Fibre Channel Network Identifier (FCID). Within a Fibre Channel network, all Fibre Channel devices have a World Wide Name (WWN). More specifically, a Node WWN (NWWN) is the WWN of the node that is connected to a particular port. In other words, the NWWN is the WWN of the system, storage device, or subsystem that is connected to the switch port. In addition to a Node WWN, a Port WWN (PWWN) serves as a given name for a particular port (FWWN for a particular fiber port). A Fibre Channel network ID (FCID) for the particular switch port is used to identify the physical location of a port. Each Fibre Channel device may have multiple ports, each of which is uniquely identified by a NWWN and a PWWN. In the following description, PWWN or NWWN may be used interchangeably with the shortened identifier "WWN."

In the proxy mode 1, the DVT gets a new PWWN and a new FCID. This arrangement allows the initiator and target to sit anywhere in the network and not be directly coupled to a port of the switch on which resides the DVT. That is, the DVT may reside anywhere in the network with respect to the initiator and target. When the initiator sends data to the DVT, the routing protocol will then work to forward the data to the DVT wherever it resides. When the data reaches the DVT, the routing then handles forwarding the data to the target and appliance (e.g., via a VI associated with the DVT).

Figure 5:
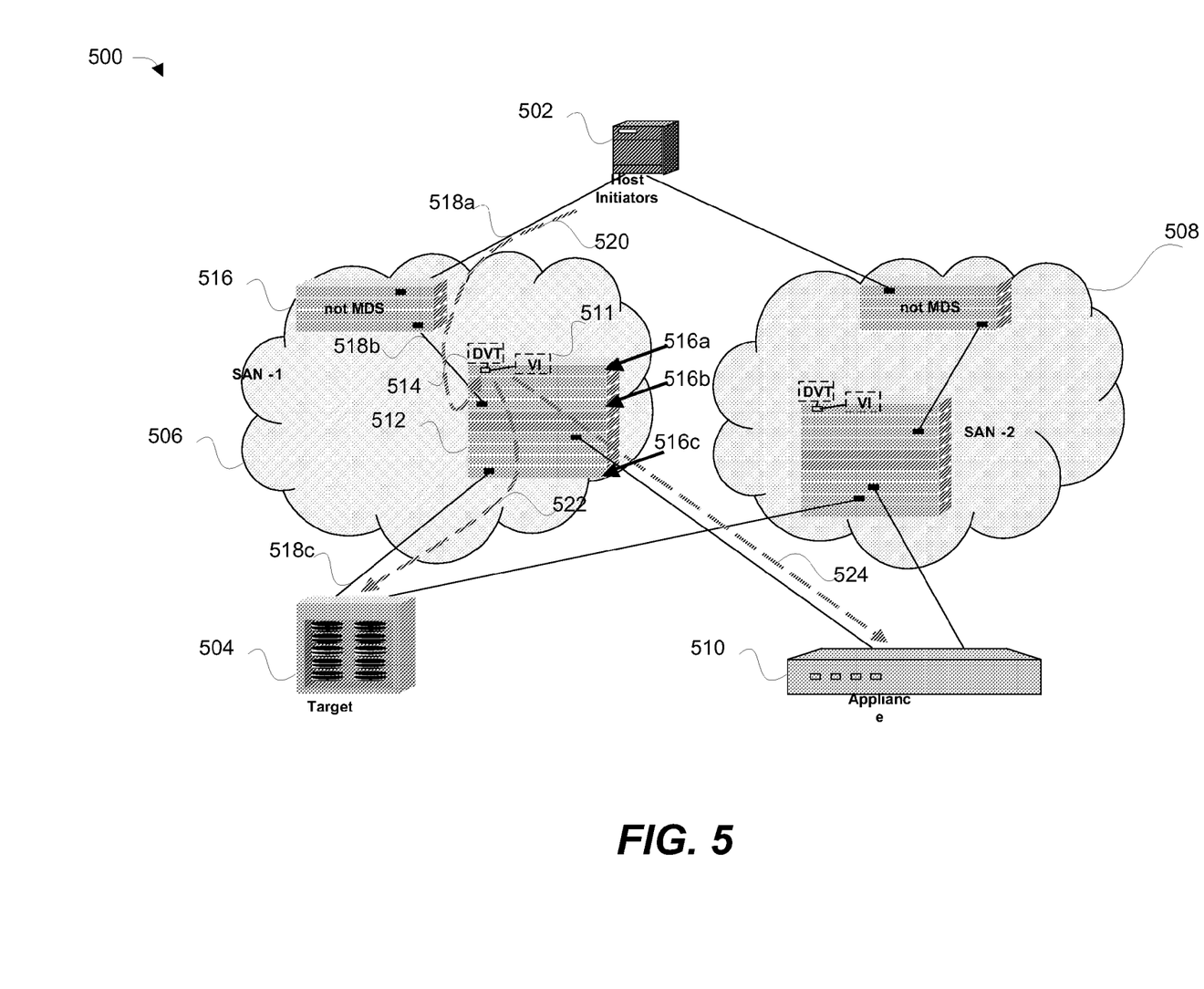
FIG. 5 illustrates a data tapping configuration in a first proxy mode (proxy mode 1) of operation in accordance with a first implementation of the present invention.

FIG. 5 illustrates a data tapping configuration in a first proxy mode (proxy mode 1) of operation in accordance with a first implementation of the present invention. As shown, a host initiator 502 is coupled to a non-MDS switch 516 that is not configurable with a DVT. The non-MDS switch 516 is itself coupled to an MDS switch 512 on which resides a DVT 514. The MDS switch 512 is coupled to a target 504. The devices in the path between the initiator and the target represent a first SAN 506. Also shown is a redundant path between the initiator 502 through a second SAN 508. Either path may be used by initiator 502, depending on which path is active or failing.

Since the DVT has a unique PWWN and FCID, the DVT 514 can be positioned in a different path than the path that is between the initiator 502 and the target 504 and data can still be routed properly from the initiator to the DVT and then to the target. Also, the path between the initiator and target may contain non-MDS switches that simply are configured to route data to ports or nodes having unique PWWN and FCID pairs and do not have to be configured to implement MDS functions such as VSAN groups.

As shown for the first SAN 506, the DVT 514 and VI 511 reside on a different intelligent line card in the MDS switch 512 than the ports which are coupled directly to the non-MDS switch 516 (and indirectly the initiator) and target 504. That is, the initiator 502 is coupled to a port on the non-MDS switch 516 via path 518a; the non-MDS switch 516 is then coupled directly to a port of line card 516b of MDS switch 512 via path 518b; and a port the MDS switch 512 on line card 516c is coupled directly to the target via path 518c. In contrast, the DVT 514 is in the form of a port that resides on line card 516a. Data can be routed from the initiator to the target 504 through paths 520 and 522. The data or a copy of the data is also routed via path 524 to appliance 510. A standard routing protocol is used to accomplish these data routes.

Of course in this implementation, the initiator 502 needs to obtain the new PWWN and new FCID of the DVT. In this case, when the DVT is created in the switch, the initiator is not aware of the new FCID or new PWWN. That is, the initiator 502 is only aware of the PWWN and FCID that were obtained from the switch in its initial login procedure to the switch 512 port. The initiator needs to know the new FCID and PWWN of the new target DVT in order to access the new target (i.e., DVT). Also, many current implementations do not make use of mechanisms for initiators to automatically learn about new available targets (i.e., DVT). Instead, files are typically manually created on a host to tell it what targets it must use. Thus, under current protocols the initiator's configuration is changed so that the new PWWN and new FCID of a new DVT are provided to the associated initiator 502. In one implementation, an administrator may configure these identifies (e.g., PWWN and FCID of the DVT) in the initiator 502 after a new DVT is set up. More typically, the initiator is configured with the new PWWN and obtains the new FCID by a new login procedure to the name server using the PWWN of the target. Mappings between the DVT and both the real target and appliance are also set up in the switch to facilitate routing and data tapping.

Perhaps in future protocol versions when mechanisms are universally implemented to automatically inform the initiator of new targets, the initiators will never have to be manually configured. Since under the present protocol the initiator needs to be configured with the new PWWN and FCID, this mode is disruptive and data exchange between the initiator and DVT cannot commence until reconfiguration is complete.

Figure 6:
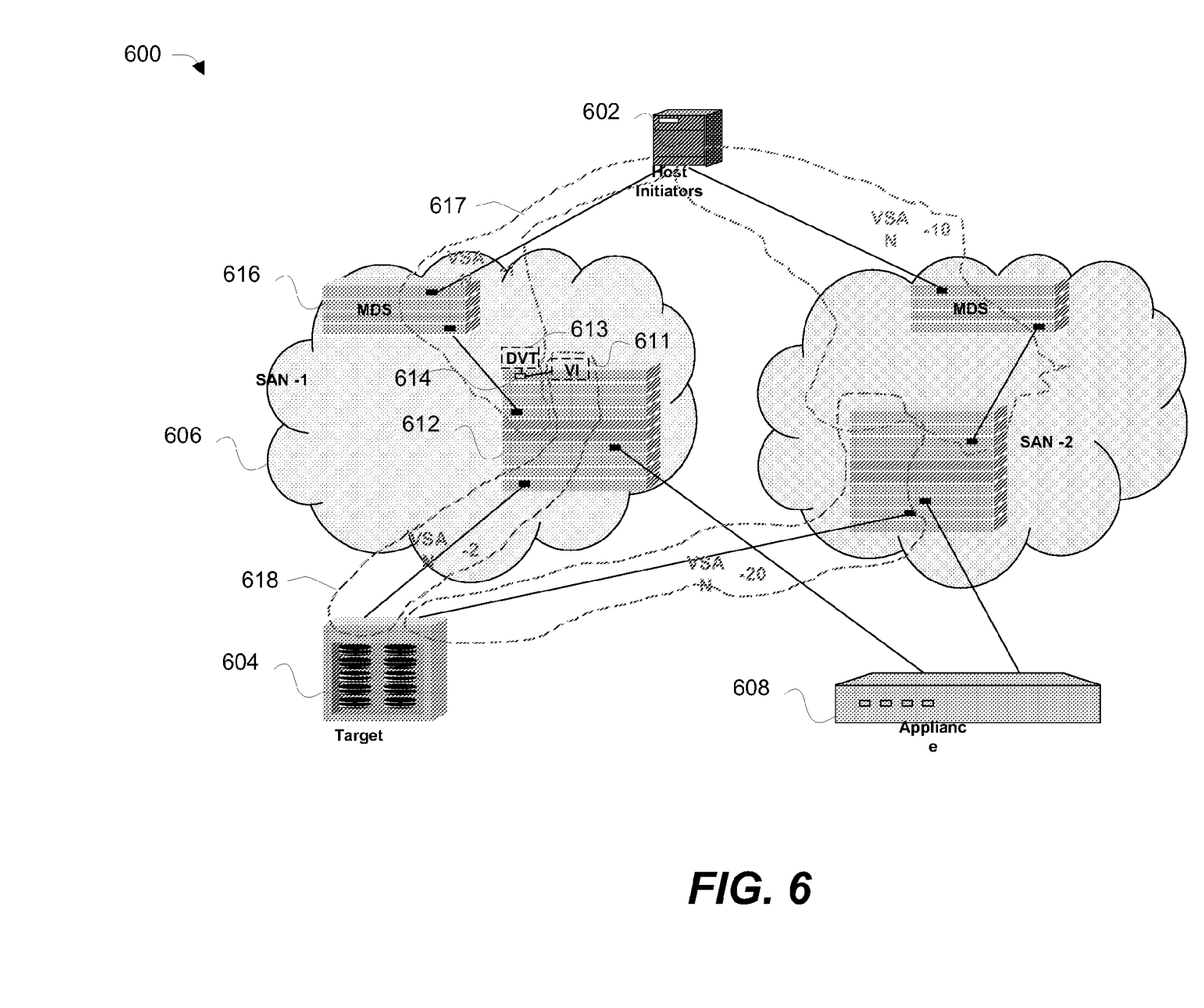
FIG. 6 illustrates a data tapping configuration in a second proxy mode (proxy mode 2) of operation in accordance with a second implementation of the present invention.

FIG. 6 illustrates a data tapping configuration in a second proxy mode (proxy mode 2) of operation in accordance with a second implementation of the present invention. In this mode, the DVT has the same PWWN as the corresponding target and a new FCID that differs from the target's FCID. In this mode, the initiator does not have to be reconfigured with the PWWN of the target. In one implementation of the Fibre Channel protocol, the initiator can use this same PWWN of the original target to then log in to get the new FCID of the new DVT. For instance, the initiator disconnects and reconnects to the switch (or the data tap service sends a disconnect to the initiator which would result in an automatic reconnect) to perform an initialization procedure so as to obtain the new FCID of the new DVT. Alternatively, the initiator can accomplish the same thing by performing a software restart.

In a current implementation (and perhaps future implementations) of Fibre Channel protocol, the same target cannot have a same PWWN unless they reside in different VSANs. Thus, DVT belongs to a first VSAN 617, while the original target and target port belong to a second different VSAN 618. Another entity referred to as a virtual initiator (VI) 611 may also be used to log into the target to obtain identification information (e.g., FCID) of the target and then to route data received at the DVT 614 from itself in its role as an initiator to the target 604. In this implementation, the VI 611 belongs to the same VSAN 618 as the target 604. If there are any switches present between the initiator and the switch that is implementing the DVT, the intervening switches have to be configurable with a particular VSAN. That is, an intervening switch between the initiator and the DVT switch has to be configured with the same VSAN as the DVT. In the illustrated embodiment, a MDS switch 616 is present between the initiator 602 and the switch 612 having the DVT 613 although any suitable switch that implements VSANs may be utilized. Likewise, any intervening switch positioned between the switch 612 having the DVT 613 and VI 611 and the target 604 needs to be configurable with a particular VSAN (not shown). That is, an intervening switch between the initiator and the DVT (or VI) switch has the same VSAN as the VI. The intervening switch also allows traffic for its own VSAN.

In both proxy modes 1 and 2, the VI uses a different FCID then the DVT. In the proxy mode 2, the VI also uses different FCIDs when sending data to the real target and the appliance, while in proxy mode 1 the VI uses the same FCID. In a specific proxy mode 2 implementation, two VIs are used: one to write to the real target and the other to write to the appliance. These two VIs have different FCIDs and different WWNs. The reason that the DVT and VIs have different FCIDs in proxy mode 2 is that the VIs are sending data to different VSANs when they are sending data to the appliance and the target. That is, the appliance is either in the same VSAN as the initiator or the target, but not both. The Appliance could also be in a third VSAN which is neither the initiator VSAN nor the target VSAN. Thus, the VIs must have a unique identity in each VSAN in order to send data to each VSAN.

Both of the proxy modes 1 and 2 require some reconfiguration and/or re-initialization of the initiator to obtain a new PWWN and/or new FCID of the new DVT. Another mode that does not require any reconfiguration or re-initialization of the initiator is referred to as a "transparent mode." The transparent mode includes setting up a new DVT that has a same PWWN and same FCID as the original target. In other words, creation of a new DVT (and VI) between the initiator and original target does not cause any disruption in the communication between the initiator and original target. Once the DVT is set up, data flows seamlessly between the initiator and original target without any changes from the initiator's or the target's side. Advantageously, the initiator does not have to be informed about the new DVT, but can simply continue sending data to the original target before, during, and after creation of a new DVT without disruption.

In this implementation, the DVT and its associated VI can merely serve as software entities and do not require any physical manifestation. That is, the new DVT does not have to be advertised to the devices outside the switch as an available physical target. The initiators do not have to become aware of the new DVT. The DVT and VI can merely serve as entities that perform the data tapping between the initiator and the real target.

Figure 7:
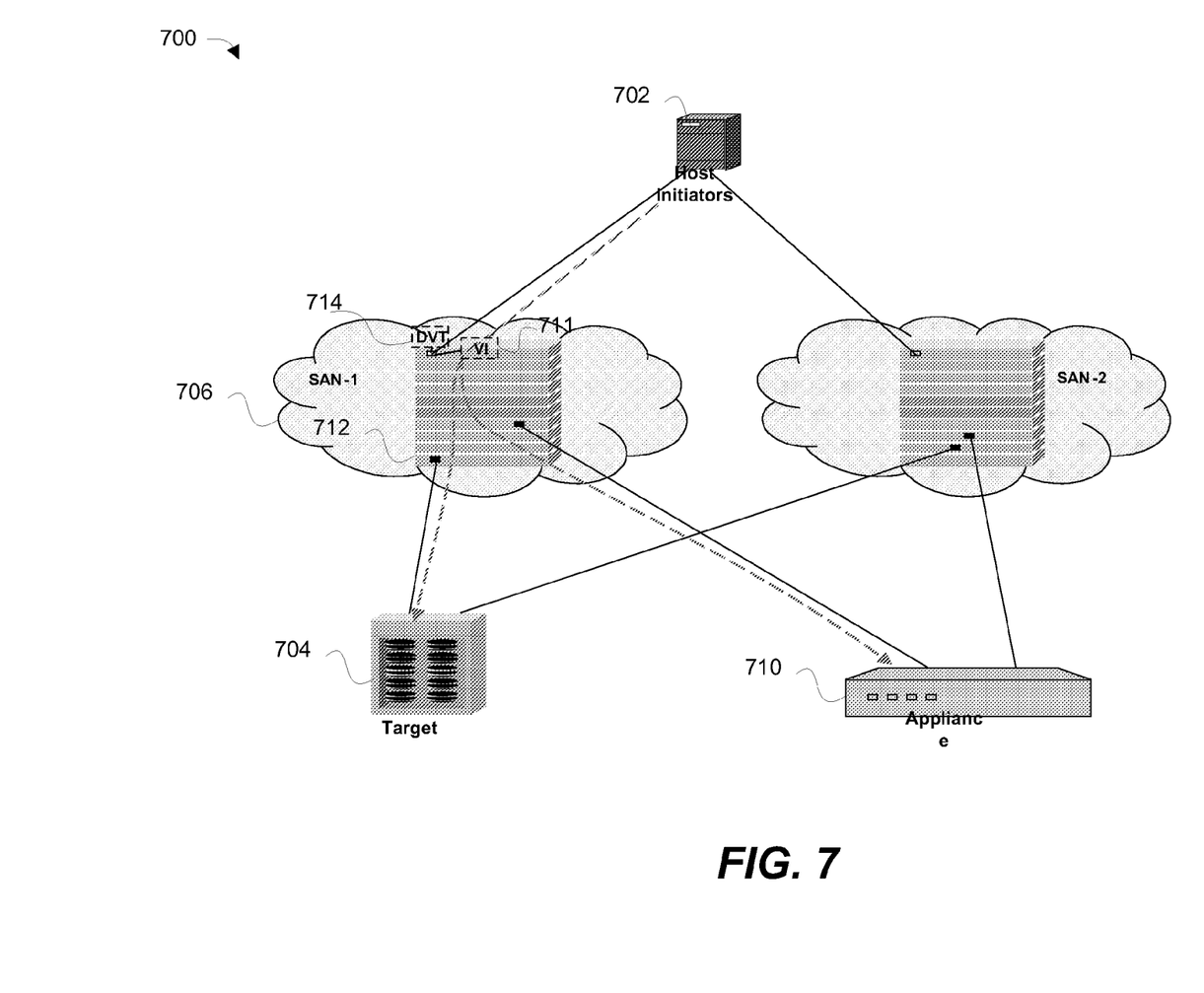
FIG. 7 is a diagrammatic representation of an example data tapping configuration in a transparent mode of operation in accordance with a third implementation of the present invention.

FIG. 7 is a diagrammatic representation of an example data tapping configuration is transparent mode in accordance with a third implementation of the present invention. As shown, an initiator 702 is coupled with switch 712 of SAN 706. The switch 712 is coupled with a target 704 and an appliance 710. When a DVT 714 having the same PWWN and FCID as the target 704 is created in the switch, data is, in effect, routed from the initiator 702 to the DVT 714. A virtual initiator (VI) 711 then routes the data received by the DVT to both the target 704 and the corresponding appliance 710. In a sense, the DVT can be said to merely snoop the traffic going from the initiator to the target. The DVT identifies traffic going between the initiator and target and copies such identified data. This copied data is then routed to the appliance 704.

In this implementation, the DVT needs to be placed in the routing path between the initiator and the target so as to ensure that the DVT receives the data sent between the initiator and target. Thus, in the illustrated implementation, the initiator and target are both coupled directly to the switch although only one of these devices needs to be connected directly to the switch that contains the data tapping DVT for such devices.

For all three modes relationships between the new DVT, initiator, original target, and appliance are also retained or set up in the switch. In one implementation, mappings between the connected entities are generated in the switch to thereby facilitate routing between the initiator and the new DVT, between the new DVT (and new VI) and the original target, and between the new DVT (and VI) and appliance, as well as the data tapping features for sending data from the DVT to both the original target and the corresponding appliance. VSAN and zoning may also be setup for each new DVT and VI pair. Several embodiments for creating a virtual port and their associated mappings are further described in co-pending U.S. patent applications (1) application Ser. No. 10/056,238 entitled "METHODS AND APPARATUS FOR IMPLEMENTING VIRTUALIZATION OF STORAGE WITHIN A STORAGE AREA NETWORK" filed 23 Jan. 2002 by Thomas James Edsall et al. and (2) application Ser. No. 10/045,883 entitled "METHODS AND APPARATUS FOR IMPLEMENTING VIRTUALIZATION OF STORAGE WITHIN A STORAGE AREA NETWORK THROUGH A VIRTUAL ENCLOSURE" filed 9 Jan. 2002 by Sanjaya Kumar et al., which applications are herein incorporated by reference in their entirety for all purposes.

The techniques of the present invention may be implemented in any suitable combination of hardware and software. For example, they can be implemented in an operating system kernel, in a separate user process, in a library package bound into network applications, on a specially constructed machine, or on a network interface card. In a specific implementation, they are implemented on a fabric switch of a storage area network.

Several suitable fabric switch systems and their accompanying software modules are described in detail in the above referenced Thomas James Edsall et al. and Sanjaya Kumar et al. patent applications. In one implementation, the switch includes at least one memory device and at least one processor. The memory and processor are operable to perform any of the above described techniques, as well as standard switching/routing operations, virtualization management, zone management, etc.

Regardless of fabric switch's configuration, it may employ one or more memories or memory modules configured to store data, database(s), and program instructions for the general-purpose network operations and/or the inventive techniques described herein. The program instructions may control the operation of an operating system and/or one or more applications, for example. The memory or memories may also be configured to store name server, routing information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, although a DVT is described as tapping data for one or more specific sessions, of course, the DVT data tapping may be configured to tap all data for a specific target or specific LUN of a target, etc. Therefore, the described embodiments should be taken as illustrative and not restrictive, and the invention should not be limited to the details given herein but should be defined by the following claims and their full scope of equivalents.

What is claimed is:

1. A method of facilitating data tapping in a storage area network, the method comprising:
   in a storage area network (SAN), receiving SAN data that is being sent from an initiator to a target;
   in the SAN, sending the SAN data or a copy of the SAN data to both the target and to an appliance device;
   creating a control virtual target (CVT) in a network device for receiving one or more commands from the appliance device regarding data tapping setup or initiation or control;
   creating a data virtual target (DVT) within the SAN such that the DVT intercepts the SAN data from the initiator that is being sent to the target; and
   creating a virtual initiator (VI) in the SAN, wherein when the SAN data is intercepted by the DVT, the VI sends the SAN data, that is received by the DVT, or a copy of the SAN data, that is received by the DVT, from the VI to both the target and to the appliance device,
   wherein the creation of the DVT and the VI is specified by the appliance device by sending to the network device one or more commands that specify creation of the DVT, wherein the network device is coupled to the initiator and target and configured for handling SAN data traffic between the initiator and the target.

2. The method as recited in claim 1, wherein the target is a real target.

3. The method as recited in claim 1, wherein the target is a virtual target.

4. The method as recited in claim 1, wherein the appliance device is configured with at least one application that uses the SAN data or a copy of the SAN data.

5. The method as recited in claim 1, wherein the one or more commands specify the initiator, the target, and a specific logical unit (LUN) of the specified target to thereby define a specific session for data tapping on the specified DVT.

6. The method as recited in claim 1, wherein a copy of the SAN data is sent to the appliance device and the SAN data is sent to the target, and wherein an FCID (fibre channel identifier) and LUN (logical unit) of the appliance device is substituted for the FCID and LUN of the target in the SAN data copy prior to sending the SAN data copy to the appliance device.

7. The method as recited in claim 1, further comprising:
   coupling the initiator and the appliance device to ports of a network device with the target being also initially coupled or previously coupled with the network device;
   configuring security for the network device and configuring specific VSANs (virtual storage area networks) and zones as needed on specific ports and/or slots of the network device;
   enabling specific one or more ports of the network device for data tapping;
   creating a data virtual target (DVT) on an enabled port of the network device such that the DVT receives the SAN data from the initiator, wherein the network device is configured to receive data from the initiator and send data to the target, wherein one or more sessions are specified for implementing a data tap on the created DVT; and
   commencing the data tap on the created DVT and its associated session(s) so that SAN data from the initiator or a copy of the SAN data from the initiator is sent to both the target and appliance device.

8. The method as recited in claim 1, wherein the DVT has a same port world wide name (PWWN) and fibre channel identifier (FCID) as the target.

9. The method as recited in claim 1, wherein the DVT has a same PWWN as the target's PWWN, but a different FCID than the target's FCID.

10. The method as recited in claim 1, wherein the DVT has a different PWWN than the target's PWWN and a different FCID than the target's FCID.

11. The apparatus in a storage area network (SAN) for facilitating data tapping in such SAN, comprising:
    one or more processors;
    one or more memory, wherein at least one of the processors and memory are adapted for:
    receiving SAN data that is being sent from an initiator to a target; and
    sending the SAN data or a copy of the SAN data to both the target and to an appliance device;
    creating a control virtual target (CVT) in a network device for receiving one or more commands from the appliance device regarding data tapping setup or initiation or control;
    creating a data virtual target (DVT) within the SAN such that the DVT intercepts the SAN data from the initiator that is being sent to the target; and creating a virtual initiator (VI) in the SAN, wherein when the SAN data is intercepted by the DVT, the VI sends the SAN data, that is received by the DVT, or a copy of the SAN data, that is received by the DVT, from the VI to both the target and to the appliance device, wherein the creation of the DVT and the VI is specified by the appliance device by sending to the network device one or more commands that specify creation of the DVT, wherein the network device is coupled to the initiator and target and configured for handling SAN data traffic between the initiator and the target.

12. The apparatus as recited in claim 11, wherein the appliance device is configured with at least one application that uses the SAN data or a copy of the SAN data.

13. The apparatus as recited in claim 11, wherein the one or more commands specify the initiator, the target, and a specific logical unit (LUN) of the specified target to thereby define a specific session for data tapping on the specified DVT.

14. The apparatus as recited in claim 11, wherein a copy of the SAN data is sent to the appliance device and the SAN data is sent to the target, and wherein an FCID (fibre channel identifier) and LUN (logical unit) of the appliance device is substituted for the FCID and LUN of the target in the SAN data copy prior to sending the SAN data copy to the appliance device.

15. The apparatus as recited in claim 11, wherein the at least one of the processors and memory are further adapted for:

coupling the initiator and the appliance device to ports of a network device with the target being also initially coupled or previously coupled with the network device;

configuring security for the network device and configuring specific VSANs (virtual storage area networks) and zones as needed on specific ports and/or slots of the network device;

enabling specific one or more ports of the network device for data tapping;

creating a data virtual target (DVT) on an enabled port of the network device such that the DVT receives the SAN data from the initiator, wherein the network device is configured to receive data from the initiator and send data to the target, wherein one or more sessions are specified for implementing a data tap on the created DVT; and commencing the data tap on the created DVT and its associated session(s) so that SAN data from the initiator or a copy of the SAN data from the initiator is sent to both the target and appliance device.

16. The apparatus as recited in claim 11, wherein the DVT has a same port world wide name (PWWN) and fibre channel identifier (FCID) as the target.

17. The apparatus as recited in claim 11, wherein the DVT has a same PWWN as the target's PWWN, but a different FCID than the target's FCID.

18. The apparatus as recited in claim 11, wherein the DVT has a different PWWN than the target's PWWN and a different FCID than the target's FCID.

19. An apparatus for facilitating data tapping in a storage area network, comprising:

in a storage area network (SAN), means for receiving SAN data that is being sent from an initiator to a target; and in the SAN, means for sending the SAN data or a copy of the SAN data to both the target and to an appliance device;

means for creating a control virtual target (CVT) a the network device for receiving one or more commands from the appliance device regarding data tapping setup or initiation or control;

means for creating a data virtual target (DVT) within the SAN such that the DVT intercepts the SAN data from the initiator that is being sent to the target; and means for creating a virtual initiator (VI) in the SAN, wherein when the SAN data is intercepted by the DVT, the VI sends the SAN data, that is received by the DVT, or a copy of the SAN data, that is received by the DVT, from the VI to both the target and to the appliance device, wherein the creation of the DVT and the VI is specified by the appliance device by sending to the network device one or more commands that specify creation of the DVT, wherein the network device is coupled to the initiator and target and configured for handling SAN data traffic between the initiator and the target.

20. A system for facilitating data tapping in a storage area network, comprising:

in the SAN, a target for receiving requests from initiators;

an initiator for sending SAN data to the target;

in the SAN, a network device coupled to the initiator and target and configured for handling SAN data traffic between the initiator and the target, the network device including a control virtual target (CVT) in the network device for receiving one or more commands from the appliance device regarding data tapping setup or initiation or control, a device virtual target (DVT) for intercepting SAN data from the initiators, and a virtual initiator for sending the SAN, that is intercepted by the DVT, data or a copy of the SAN data, that is received by the DVT, from the VI to both the target and an appliance outside the SAN, wherein the creation of the DVT and the VI is specified by the appliance device by sending to the network device one or more commands that specify creation of the DVT.

21. The system as recited in claim 20, further comprising a remote storage device coupled with the appliance, wherein the appliance is configured to send the SAN data or the copy of the SAN data to the remote storage device for the purpose of remote replication.

22. The system as recited in claim 20, further comprising a remote storage device coupled with the appliance, wherein the appliance is configured to send the SAN data or the copy of the SAN data to the remote storage device at various increments of time for the purpose of continuous backup so that one can access the SAN data that was sent during specific periods of time.

23. The system as recited in claim 20, wherein the appliance is configured to create the DVT in the network device and to associate one or more unique session(s) for such created DVT so that data tapping is performed on the DVT for the associated unique one or more session(s).

* * * * *